(12) United States Patent
Mikami

(10) Patent No.: US 11,498,350 B2
(45) Date of Patent: Nov. 15, 2022

(54) PRINTING APPARATUS WITH CONTRACT RELATED ORDERING, ORDERING SYSTEM, AND CONTROL METHOD

(71) Applicant: CANON KABUSHIKI KAISHA, Tokyo (JP)

(72) Inventor: Ruriko Mikami, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/120,706

(22) Filed: Dec. 14, 2020

(65) Prior Publication Data

US 2021/0237494 A1 Aug. 5, 2021

(30) Foreign Application Priority Data

Jan. 31, 2020 (JP) .............................. JP2020-014808

(51) Int. Cl.
| | |
|---|---|
| *B41J 29/38* | (2006.01) |
| *G06Q 30/06* | (2012.01) |
| *G06F 3/12* | (2006.01) |
| *H04N 1/34* | (2006.01) |

(52) U.S. Cl.
CPC ................ *B41J 29/38* (2013.01); *G06F 3/12* (2013.01); *G06Q 30/06* (2013.01); *H04N 1/34* (2013.01)

(58) Field of Classification Search
None
See application file for complete search history.

(56) References Cited

U.S. PATENT DOCUMENTS

| | | | |
|---|---|---|---|
| 10,493,784 B2 | 12/2019 | Yamada et al. | |
| 10,773,536 B2 | 9/2020 | Yamada et al. | |
| 2010/0247132 A1* | 9/2010 | Shustef | G06Q 30/06 705/26.1 |
| 2014/0023382 A1* | 1/2014 | Kawana | G03G 15/55 399/8 |
| 2018/0131831 A1* | 5/2018 | Tolia | G06F 3/1229 |
| 2020/0353762 A1 | 11/2020 | Yamada et al. | |

FOREIGN PATENT DOCUMENTS

| | | |
|---|---|---|
| JP | 2001-297237 A | 10/2001 |
| JP | 2003-280865 A | 10/2003 |

* cited by examiner

*Primary Examiner* — Andrew H Lam
(74) *Attorney, Agent, or Firm* — Venable LLP

(57) ABSTRACT

A printing apparatus includes a sending unit to send an order request for requesting an ordering apparatus to order a consumable in a case where a predetermined condition regarding a consumable of which the degree exceeds a predetermined degree is satisfied based on the information related to a contract and information related to the consumable. The sending unit sends the order request based on information related to a current contract and the information related to the consumable in a case where a remaining contract period based on a contract expiration date of the current contract is equal to or more than a predetermined number of dates and sends the order request based on the information related to a next contract in a case where the remaining contract period based on the contract expiration date of the current contract is less than the predetermined number of dates.

8 Claims, 6 Drawing Sheets

| INK TANK INFORMATION \ CONTRACT INFORMATION | ONE-OFF CONTRACT | FLAT-RATE CONTRACT | OTHER CONTRACTS |
|---|---|---|---|
| SETUP INK TANK | SEND AN ORDER REQUEST | DO NOT SEND AN ORDER REQUEST | DO NOT SEND AN ORDER REQUEST |
| ONE-OFF INK TANK | SEND AN ORDER REQUEST | DO NOT SEND AN ORDER REQUEST | DO NOT SEND AN ORDER REQUEST |
| FLAT-RATE INK TANK | DO NOT SEND AN ORDER REQUEST | SEND AN ORDER REQUEST | DO NOT SEND AN ORDER REQUEST |
| OTHER INK TANKS | DO NOT SEND AN ORDER REQUEST | DO NOT SEND AN ORDER REQUEST | DO NOT SEND AN ORDER REQUEST |

FIG.4

| INK TANK INFORMATION \ COLOR INFORMATION | CYAN | MAGENTA | YELLOW | BLACK |
|---|---|---|---|---|
| SETUP INK TANK | DELIVER A CYAN SETUP INK TANK AND CHARGE THE COST | DELIVER A MAGENTA SETUP INK TANK AND CHARGE THE COST | DELIVER A YELLOW SETUP INK TANK AND CHARGE THE COST | DELIVER A BLACK SETUP INK TANK AND CHARGE THE COST |
| ONE-OFF INK TANK | DELIVER A CYAN ONE-OFF INK TANK AND CHARGE THE COST | DELIVER A MAGENTA ONE-OFF INK TANK AND CHARGE THE COST | DELIVER A YELLOW ONE-OFF INK TANK AND CHARGE THE COST | DELIVER A BLACK ONE-OFF INK TANK AND CHARGE THE COST |
| FLAT-RATE INK TANK | DELIVER A CYAN FLAT-RATE INK TANK AND DO NOT CHARGE THE COST | DELIVER A MAGENTA FLAT-RATE INK TANK AND DO NOT CHARGE THE COST | DELIVER A YELLOW FLAT-RATE INK TANK AND DO NOT CHARGE THE COST | DELIVER A BLACK FLAT-RATE INK TANK AND DO NOT CHARGE THE COST |

FIG.5

PRINTING APPARATUS WITH CONTRACT RELATED ORDERING, ORDERING SYSTEM, AND CONTROL METHOD

BACKGROUND OF THE INVENTION

Field of the Invention

The present invention relates to a printing apparatus that performs printing with consumption of a consumable, an ordering system for ordering a consumable of the printing apparatus, and a control method for controlling the printing apparatus.

Description of the Related Art

In Japanese Patent Laid-Open No. 2001-297237, there is disclosed a technology related to an ordering system including a consumable automatic ordering apparatus that obtains the remaining amount of a consumable, such as ink of a printing apparatus, via the Internet and orders the consumable automatically.

By the way, as for a consumable that need to be replaced or replenished, there is a case of placing an order according to various contracts for the printing apparatus. Such contracts include, for example, a first contract, in which the user pays the cost related to an order of the consumable at the timing of ordering and receives the consumable, and a second contract, in which the user pays a flat-rate cost periodically and receives the consumable without paying the cost related to an order of the consumable at the timing of ordering. There may be a case in which, in the first contract, a first consumable is provided as the consumable, and, in the second contract, a second consumable that is different from the first consumable is provided as the consumable.

A technology of ordering a consumable according to a contract is disclosed in Japanese Patent Laid-Open No. 2003-280865. In the technology disclosed in Japanese Patent Laid-Open No. 2003-280865, a server accepts information such as the consumption degree of a consumable from a printing apparatus and, based on the information, a new or recycled one of the consumable is ordered according to contract information registered in the server.

However, the ordering apparatus for ordering a consumable according to the information obtained from the apparatus that consumes the consumable does not necessarily have the contract information as in the technology disclosed in Japanese Patent Laid-Open No. 2003-280865. In this case, there is a risk that a consumable that is appropriate according to the contract information will not be ordered.

SUMMARY OF THE INVENTION

The present invention has been made in view of the above-described problems, so as to provide a technology for appropriately ordering a consumable according to contract information.

In the first aspect of the present invention, there is provided a printing apparatus including:

a first obtaining unit configured to obtain a degree of consumption or use of a consumable and information related to the consumable;

a second obtaining unit configured to obtain information related to a contract; and a sending unit configured to send an order request for requesting an ordering apparatus to order a consumable in a case where a predetermined condition regarding a consumable of which the degree exceeds a predetermined degree is satisfied based on the information related to the contract and the information related to the consumable.

In the second aspect of the present invention, there is provided an ordering system including:

an ordering apparatus that orders a consumable in response to a request, a printing apparatus that performs printing with consumption of a consumable, and a management apparatus that manages a contract for the printing apparatus, wherein the printing apparatus includes:

a first obtaining unit configured to obtain a degree of consumption or use of a consumable and information related to the consumable;

a second obtaining unit configured to obtain information related to a contract, which is managed by the management apparatus; and a sending unit configured to send an order request for requesting the ordering apparatus to order a consumable in a case where a predetermined condition regarding a consumable of which the degree exceeds a predetermined degree is satisfied based on the information related to the contract and the information related to the consumable.

In the third aspect of the present invention, there is provided a control method including:

a first obtaining step of obtaining a degree of consumption or use of a consumable and information related to the consumable;

a second obtaining step of obtaining information related to a contract; and a sending step of sending an order request for requesting an ordering apparatus to order a consumable in a case where a predetermined condition regarding a consumable of which the degree exceeds a predetermined degree is satisfied based on the information related to the contract and the information related to the consumable.

According to the present invention, a consumable can be appropriately ordered according to contract information.

Further features of the present invention will become apparent from the following description of exemplary embodiments with reference to the attached drawings.

BRIEF DESCRIPTION OF THE DRAWINGS

FIG. 4 is a table used for determining whether or not to send an order request;

FIG. 5 is a table used for determining details of an order; and

DESCRIPTION OF THE EMBODIMENTS

Hereinafter, with reference to the accompanying drawings, detailed explanations are given of examples of an embodiment of a printing apparatus, an ordering system, and a control method. Note that it is not intended that the following embodiments limit the present invention, and every combination of the characteristics explained in the present embodiments is not necessarily essential to the solution in the present invention. In addition, relative positions, shapes, etc., of the constituent elements described in the embodiments are merely examples and are not intended to limit the present invention to the range of the examples.

First Embodiment

Figure 1:
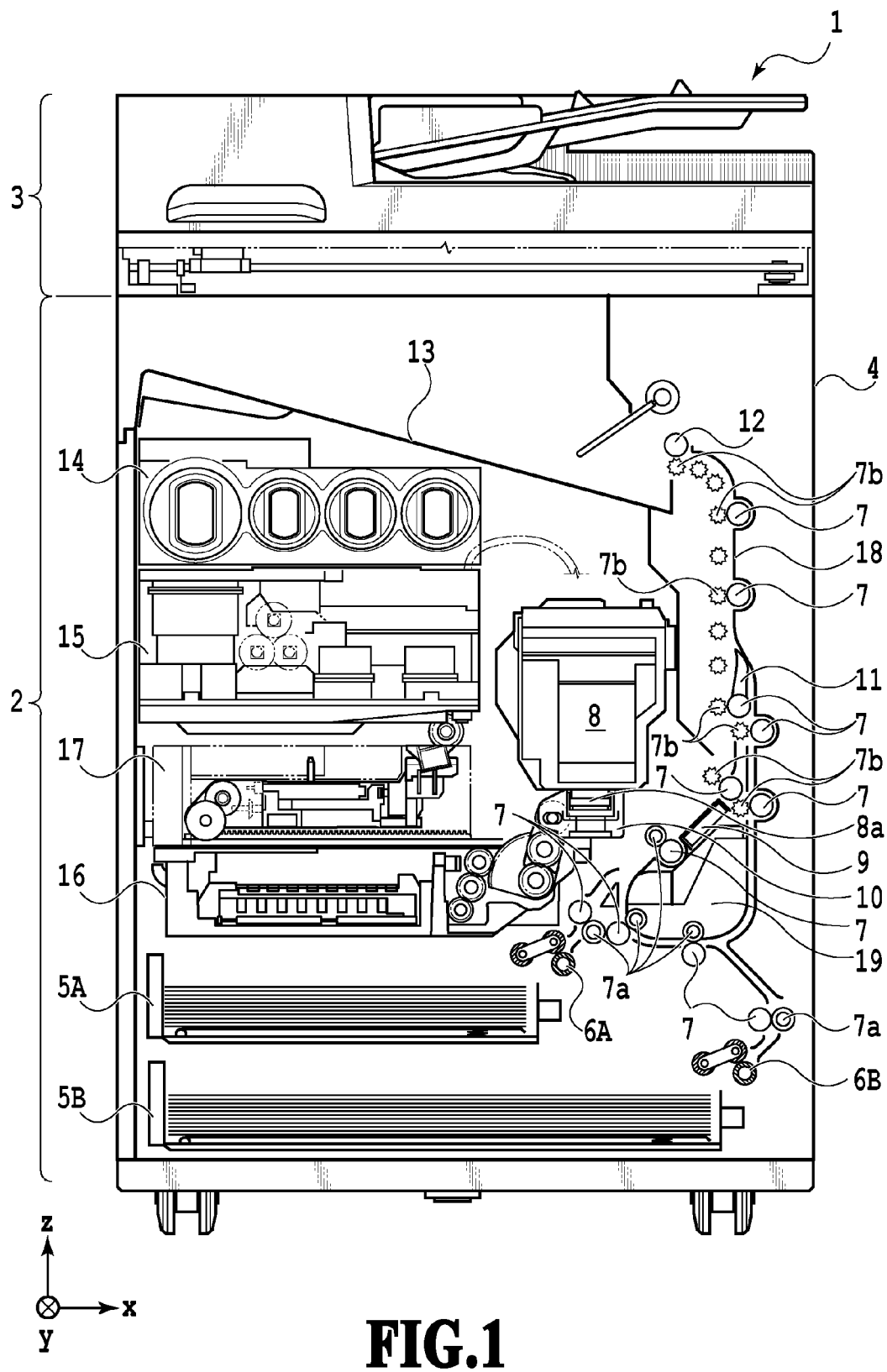
FIG. 1 is an internal configuration diagram of a printing apparatus.

FIG. 1 is an internal configuration diagram of an inkjet printing apparatus 1 (hereinafter referred to as a printing apparatus 1) used in the present embodiment. In the drawings, x-direction is the horizontal direction, y-direction (the direction perpendicular to the paper plane) is the direction in which an array of ejection ports is arranged in the later-described print head 8; and z-direction is the vertical direction.

The printing apparatus 1 is a multifunctional peripheral including a print part 2 and a scanner part 3. The printing apparatus 1 is capable of executing various processes related to a printing operation and a reading operation with the print part 2 and the scanner part 3 moving separately or moving together. The scanner part 3 includes an automatic document feeder (ADF) and a flatbed scanner (FBS). The scanner part 3 is capable of reading a document automatically fed by the ADF and reading (scanning) a document placed on a platen glass of the FBS by the user. Note that, although the present embodiment is directed to the multifunctional peripheral including both the print part 2 and the scanner part 3, a form in which the scanner part 3 is not included is possible as well. FIG. 1 is a diagram illustrating the printing apparatus 1 being in a standby state, in which neither a printing operation nor a reading operation is performed.

In the print part 2, the first cassette 5A and the second cassette 5B for accommodating a print medium (cut sheet) S are detachably installed at the bottom of the casing 4 in the vertical direction. A relatively small print medium of up to A4 size is stacked and accommodated in the first cassette 5A and a relatively large print medium of up to A3 size is stacked and accommodated in the second cassette 5B. Near the first cassette 5A, the first feeding unit 6A for separately feeding each of the accommodated print media is installed. Similarly, near the second cassette 5B, the second feeding unit 6B is installed. In a case where a printing operation is performed, a print medium S is selectively fed from either one of the cassettes.

Conveyance rollers 7, discharging rollers 12, pinch rollers 7a, spurs 7b, a guide 18, an inner guide 19, and a flapper 11 are conveyance mechanisms for guiding a print medium S in a predetermined direction. The conveyance rollers 7 are drive rollers disposed on the upstream side and on the downstream side relative to the print head 8 (platen 9) and driven by a conveyance motor, which is not herein illustrated. The pinch rollers 7a are follower rollers that rotate while nipping a print medium S together with the conveyance rollers 7. The discharging rollers 12 are drive rollers disposed on the downstream side relative to the conveyance rollers 7 and driven by a discharging motor, which is not herein illustrated. The spurs 7b pinch and convey a print medium S together with the discharging rollers 12 and the conveyance rollers 7 disposed on the downstream side relative to the print head 8 (platen 9).

The guide 18 is disposed in the conveyance path of a print medium S so as to guide a print medium S in a predetermined direction. The inner guide 19 is a member extending in the y-direction, and has a curved side surface so as to guide a print medium S along the side surface. The flapper 11 is a member for changing directions in which a print medium S is conveyed in a double-sided printing operation. The discharging tray 13 is a tray for stacking/retaining a print medium S discharged by the discharging rollers 12 after a printing operation is completed.

The print head 8 of the present embodiment is a full-line type color inkjet print head, and multiple arrays of ejection ports for ejecting ink according to print data are arranged along the y-direction of FIG. 1 so as to correspond to widths of print media S. In a case where the print head 8 is in a standby position, the ejection port surface 8a of the print head 8 is capped with the cap unit 10 as illustrated in FIG. 1. In a case where a printing operation is performed, the orientation of the print head 8 is changed by the later-described print controller 202 such that the ejection port surface 8a faces the platen 9. The platen 9 is configured with a flat plate extending in the y-direction, so as to support a print medium S, to which a printing operation is performed by the print head 8, from the back side thereof.

The ink tank unit 14 is configured with an ink tank 224 (see FIG. 2) detachably installed for storing each of four colors of ink to be supplied to the print head 8. Note that the ink tank 224 includes a non-volatile type memory 225 (see FIG. 2) in which ink tank information (described later) and additional information (described later) are stored as information related to a consumable. Note that the non-volatile type memory is also referred to as a non-volatile memory in the present specification. The ink supply unit 15 is disposed in the midstream of a flow path connecting each ink tank 224 mounted on the ink tank unit 14 and the print head 8, so as to adjust the pressure and the flow rate of ink inside the print head 8 within a suitable range. The present embodiment adopts a circulation type ink supply system, in which the ink supply unit 15 adjusts the pressure of ink supplied to the print head 8 and the flow rate of ink collected from the print head 8 within a suitable range.

The maintenance unit 16 includes the cap unit 10 and the wiping unit 17, and the maintenance unit 16 operates the cap unit 10 and the wiping unit 17 at predetermined timings, so as to perform a maintenance operation for the print head 8.

Figure 2:
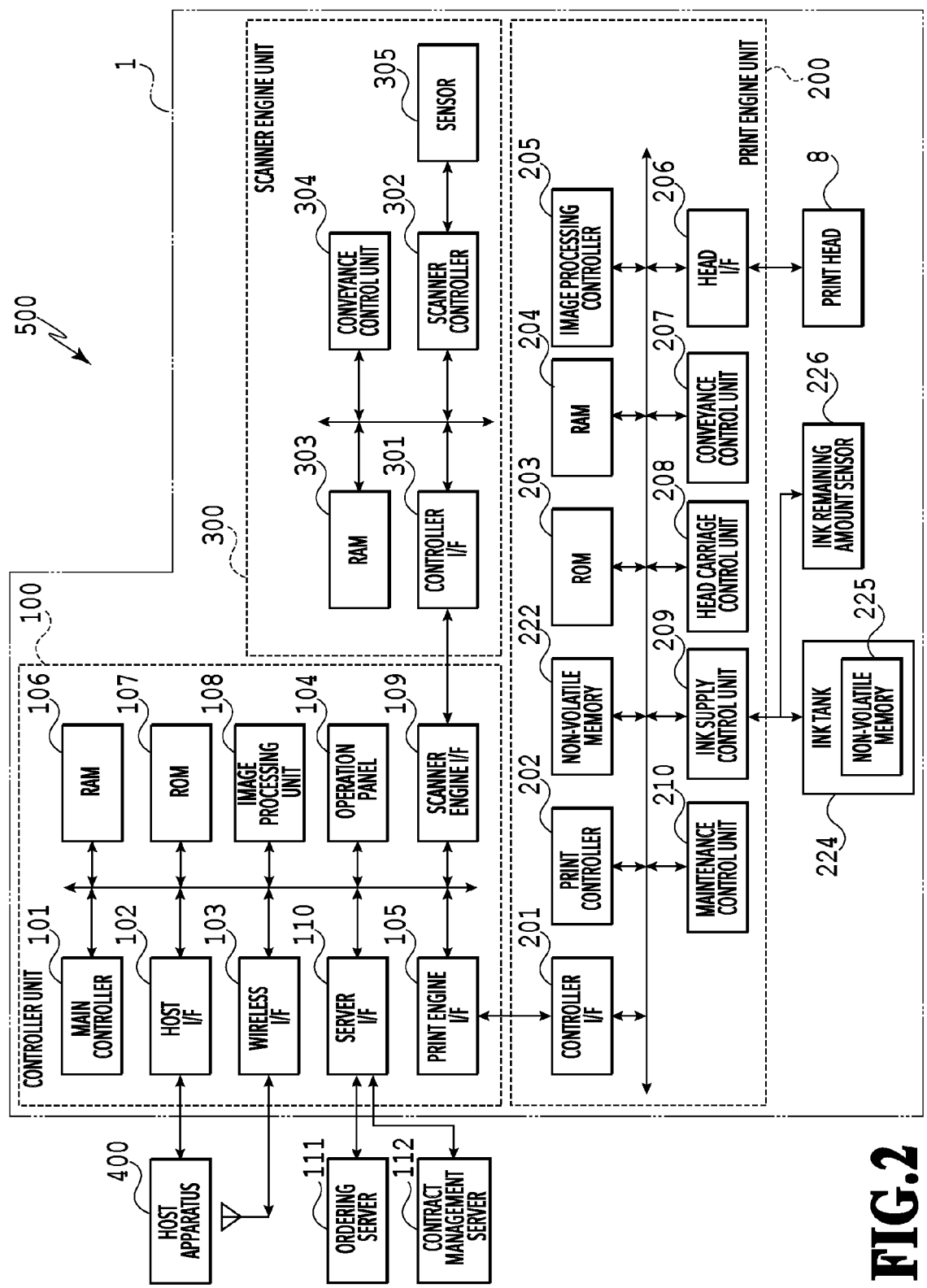
FIG. 2 is a block configuration diagram of an ordering system mainly illustrating a control configuration of the printing apparatus.

FIG. 2 is a block configuration diagram of an ordering system mainly illustrating a control configuration of the printing apparatus. The control configuration mainly includes a print engine unit 200 that exercises control over the print part 2, a scanner engine unit 300 that exercises control over the scanner part 3, and a controller unit 100 that exercises control over the entire printing apparatus 1. The print controller 202 controls various mechanisms of the print engine unit 200 in accordance with instructions from the main controller 101 of the controller unit 100. Various mechanisms of the scanner engine unit 300 are controlled by the main controller 101 of the controller unit 100. The control configuration will be explained below in detail.

In the controller unit 100, the main controller 101, which is configured with a CPU, controls the entire printing apparatus 1 by using the RAM 106 as a work area in accordance with various parameters and a program stored in the ROM 107. For example, in a case where a print job is input from the host apparatus 400 via the host I/F 102 or the wireless I/F 103, the image processing unit 108 performs predetermined image processing for received image data in accordance with instructions from the main controller 101. Then, the main controller 101 sends the image data, for which the image processing has been performed, to the print engine unit 200 via the print engine I/F 105.

Note that the printing apparatus 1 may obtain image data from the host apparatus 400 via a wireless communication or a wired communication or may obtain image data from an external storage (such as a USB memory) connected to the printing apparatus 1. There is no limitation on the communication method utilized for the wireless communication or the wired communication. For example, Wi-Fi (Wireless Fidelity; registered trademark), Bluetooth (registered trademark), or the like, is applicable for the communication method utilized for the wireless communication. Further, a USB (Universal Serial Bus) or the like is applicable for the communication method utilized for the wired communication. Moreover, for example, in a case where a scan command is input by the host apparatus 400, the main controller 101 sends this command to the scanner part 3 via the scanner engine I/F 109.

The operation panel 104 is a mechanism for the user to provide an input or output operation for the printing apparatus 1. Via the operation panel 104, the user can provide an instruction for an operation such as copying or scanning, set a print mode, recognize information about the printing apparatus 1, etc. In addition, the controller unit 100 includes the server I/F 110 that is connected via a network to each of the ordering server 111 that accepts an order of a consumable and the contract management server 112 that manages contract information for the printing apparatus 1.

Note that the ordering server 111 accepts an order request for an ink tank 224, which is output from the printing apparatus 1, and places an order for the ink tank 224, based on the order request. The contract management server 112 manages contract information, which is information related to a contract for the printing apparatus 1, etc. That is, in the present embodiment, the ordering server 111 functions as an ordering apparatus that places an order of a consumable, and the contract management server 112 functions as a management apparatus that manages a contract for the printing apparatus 1. Further, in the present embodiment, the ordering server 111 and the contract management server 112 are servers independent from each other, and, for example, contract information managed by the contract management server 112 is configured not to be sent from the contract management server 112 to the ordering server 111.

In the present embodiment, it is assumed that the contract information managed by the contract management server 112 is, for example, a one-off contract, a flat-rate contract, or the like. The one-off contract is a contract in which an ink tank 224 is delivered to the user based on an order and the cost related to the order of the ink tank 224 is charged. Further, the flat-rate contract is a contract in which, by continuing to pay a fixed cost periodically, an ink tank 224 is delivered based on an order and the cost related to the order of the ink tank 224 is not charged. Note that, in the present embodiment, an ordering system 500 that is capable of automatically ordering an ink tank 224 is configured with the printing apparatus 1, the ordering server 111, and the contract management server 112.

In the print engine unit 200, the print controller 202, which is configured with a CPU, controls various mechanisms provided in the print part 2 while using the RAM 204 as a work area in accordance with various parameters and a program stored in the ROM 203. Once various commands and image data are received via the controller I/F 201, the print controller 202 temporarily saves the various commands and image data in the RAM 204. The print controller 202 causes the image processing controller 205 to convert the saved image data into print data, so that the print head 8 can utilize the print data for a printing operation. After the print data is generated, the print controller 202 causes the print head 8 via the head I/F 206 to execute a printing operation based on the print data. Here, the print controller 202 drives the feeding unit 6A and 6B, the conveyance rollers 7, the discharging rollers 12, and the flapper 11 illustrated in FIG. 1 via the conveyance control unit 207, so as to convey a print medium S. The printing operation by the print head 8 is executed in synchronization with the conveyance operation of the print medium S in accordance with an instruction from the print controller 202, so that the print processing is performed.

The head carriage control unit 208 changes orientations and positions of the print head 8 in accordance with operating status of the printing apparatus 1 such as a maintenance state and a printing state. The ink supply control unit 209 controls the ink supply unit 15 such that the pressure of ink supplied to the print head 8 is controlled within a suitable range. Note that the ink supply unit 15 outputs the remaining amount of ink stored in an ink tank 224 in response to a request from the print controller 202. That is, the ink supply unit 15 outputs information related to the ink remaining amount, which is detected by the ink remaining amount sensor 226, to the print controller 202 in response to the request. Note that the ink remaining amount sensor 226 is a sensor that is capable of detecting the ink remaining amount of each ink tank 224. As for the ink remaining amount sensor 226, it is possible to use various publicly-known technologies for directly or indirectly detecting the ink remaining amount of an ink tank 224, and thus detailed explanations thereof will be omitted. The maintenance control unit 210 controls operations of the cap unit 10 and the wiping unit 17 in the maintenance unit 16 in a case of performing a maintenance operation for the print head 8.

Further, the print engine unit 200 includes the non-volatile memory 222 that stores information of a predetermined amount and the like, which is used for determining whether or not to send an order request (described later), for example. Specifically, the predetermined amount is the lower limit value of the ink remaining amount of an ink tank 224. This predetermined amount may be input in advance or may be input via the operation panel 104. Further, the predetermined amount may be set so as to be different or the same for the respective ink colors. Moreover, the non-volatile memory 222 also stores contract information for the printing apparatus 1.

In the scanner engine unit 300, the main controller 101 controls hardware resources of the scanner controller 302 while using the RAM 106 as a work area in accordance with various parameters and a program stored in the ROM 107. Accordingly, various mechanisms provided in the scanner part 3 are controlled. For example, the main controller 101 controls hardware resources in the scanner controller 302 via the controller I/F 301, so that a document placed on the ADF by the user is conveyed via the conveyance control unit 304 and read by the sensor 305. Then, the scanner controller 302 saves the read image data in the RAM 303. Note that the print controller 202 is capable of converting such image data obtained as described above into print data to enable the print head 8 to execute a printing operation based on the image data read by the scanner controller 302.

Note that a program for implementing one or more functions of the printing apparatus 1 (controller unit, print engine unit, scanner engine unit) or the host apparatus 400 is supplied to a system or an apparatus via a network or various storage media. A computer (CPU, MPU, etc.) of the system or the apparatus reads the program and executes the functions. Alternatively, it is also possible to cause various mechanisms to execute the functions. Further, this program may be implemented by one computer or may be implemented by multiple computers moving together. Moreover, it is not necessary to implement all of the above-described processes by software, and a part or all of the processes may be implemented by hardware such as an ASIC. Furthermore, the form is not limited to the one in which all processes are performed by one CPU, and there may be such a form in which multiple CPUs appropriately move together so as to perform the processes. Further, there may be such a form in which one CPU executes any of the processes and multiple CPUs moves together so as to perform the other processes.

The main controller 101 according to the present embodiment automatically outputs an order request for ordering an ink tank 224 to the ordering server 111 according to the ink remaining amount of an ink tank 224. That is, in the present embodiment, the main controller 101 functions as a sending part that sends an order request for an ink tank 224, which is a consumable.

The main controller 101 periodically obtains contract information for the printing apparatus 1 from the contract management server 112 via the server I/F 110 and stores the contract information in the non-volatile memory 222. That is, for example, the main controller 101 requests the contract management server 112 for contract information for the printing apparatus 1 at a predetermined timing and obtains the contract information for the printing apparatus 1, which is output from the contract management server 112 based on the request. Then, the obtained contract information is stored in the non-volatile memory 222 via the print engine I/F 105 and the controller I/F 201. The predetermined timing is, for example, the timing at which the printing apparatus 1 is activated, etc.

In a case where the condition (predetermined condition) under which an order request for an ink tank 224 can be sent is satisfied, the main controller 101 sends an order request to the ordering server 111 via the server I/F 110. Here, the main controller 101 adds additional information to the order request. The additional information is stored in the non-volatile memory 225 provided for the ink tank 224. The additional information is, for example, information related to an ink color or a serial number for identifying the ink tank 224. The condition under which an order request can be sent will be described later.

In the present embodiment, four ink tanks 224 storing inks of different colors, respectively, are mounted in the ink tank unit 14. Specifically, an ink tank storing cyan ink, an ink tank storing magenta ink, an ink tank storing yellow ink, and an ink tank storing black ink are mounted in the ink tank unit 14. The print controller 202 periodically performs polling via the ink supply control unit 209, so as to obtain the ink remaining amount of each ink tank 224 by use of the ink remaining amount sensor 226.

Figure 3:
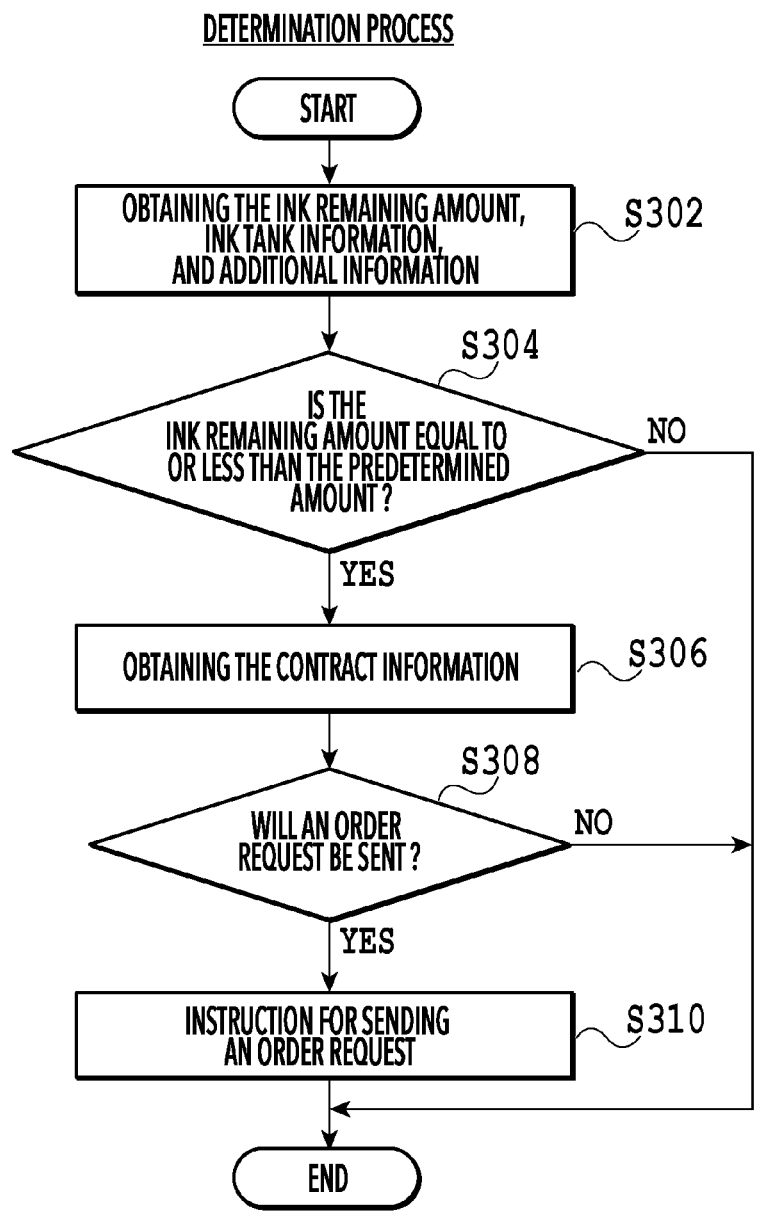
FIG. 3 is a flowchart illustrating details of processing of a determination process performed by the printing apparatus according to the first embodiment.

In the above-described configuration, the printing apparatus 1 periodically executes a determination process for determining whether or not to order an ink tank 224. FIG. 3 is a flowchart illustrating details of processing of the determination process performed by the printing apparatus according to the first embodiment. The series of processes illustrated in the flowchart of FIG. 3 is performed by the print controller 202 retrieving a program code stored in the ROM 203 into the RAM 204 and executing the program code. Alternatively, a part or all of the functions in the steps of FIG. 3 may be executed by hardware such as an ASIC or an electronic circuit. Note that the symbol "S" in the explanation of each process means that it is a step in the flowchart (the same applies hereinafter in the present specification).

This determination process is executed by the print controller 202, based on an instruction from the main controller 101. In the present embodiment, the main controller 101 periodically instructs the print controller 202 to execute the determination process.

In a case where the determination process is started based on the instruction from the main controller 101, the print controller 202 firstly obtains the ink remaining amount, ink tank information, and additional information of each ink tank 224 (S302). That is, in the present embodiment, the print controller 202 functions as a first obtaining part that obtains information related to a consumable, such as ink tank information and additional information, as well as the degree of consumption or use of a consumable, such as the ink remaining amount. Note that the ink tank information is information indicating the type of ink tank corresponding to contract information. Details are described later.

Specifically, in S302, the print controller 202 obtains the ink remaining amount of each ink tank 224 by using the ink remaining amount sensor 226 via the ink supply control unit 209. Further, the print controller 202 obtains the ink tank information and the additional information, which are stored in the non-volatile memory 225, via the ink supply control unit 209. The ink remaining amount of an ink tank 224 is associated with the ink tank information and the additional information obtained from the non-volatile memory 225 provided in the ink tank 224.

Next, the print controller 202 compares the obtained ink remaining amount with the predetermined amount stored in the non-volatile memory 222 and determines whether or not the ink remaining amount is equal to or less than the predetermined amount (S304). That is, in S304, the ink remaining amounts of the four ink tanks 224 are compared with the corresponding predetermined amounts, so that whether or not the ink remaining amount of each ink tank 224 is equal to or less than the predetermined amount is determined. In S304, in a case where it is determined that the ink remaining amount is not equal to or less than the predetermined amount, that is, that the ink remaining amounts of all the ink tanks 224 are not equal to or less than the predetermined amounts, this determination process ends. Further, in a case where it is determined in S304 that the ink remaining amount is equal to or less than the predetermined amount, that is, that the ink remaining amount of at least one ink tank 224 is equal to or less than the predetermined amount, the print controller 202 obtains the contract information stored in the non-volatile memory 222 (S306). In the present embodiment, the print controller 202 functions as a second obtaining part that obtains information related to a contract for the printing apparatus 1. Note that it is also possible that the non-volatile memory 222 is included as the second obtaining unit.

Thereafter, for the ink tank 224 of which the ink remaining amount is determined to be equal to or less than the predetermined amount, the print controller 202 determines whether or not to send an order request to the ordering server 111, based on the obtained contract information and the ink tank information (S308). That is, in S308, based on the contract information and the ink tank information associated with the ink remaining amount that is equal to or less than the predetermined amount, whether or not to send an order request is determined by use of a table stored in a recording area of the non-volatile memory 222, the ROM 203, or the like, for example. FIG. 4 is a table used for determining whether or not to send an order request. In the table of FIG. 4, "SEND AN ORDER REQUEST" or "DO NOT SEND AN ORDER REQUEST" is associated with each of the combinations of contract information for the printing apparatus 1 and ink tank information.

Here, as described above, ink tank information indicates the types of ink tanks corresponding to contract information. In the present embodiment, there are four types of ink tank information: a setup ink tank and a one-off ink tank, which correspond to a one-off contract, a flat-rate ink tank, which corresponds to a flat-rate contract, and other ink tanks. That is, since the setup ink tank and the one-off ink tank correspond to the one-off contract, a cost is incurred at the timing of ordering. On the other hand, since a predetermined cost is paid periodically for the flat-rate ink tank, no cost is incurred at the timing of ordering.

In addition, in FIG. 4, the contract information indicates contract information for the printing apparatus 1, which is obtained from the contract management server 112. In the present embodiment, the contract information includes a one-off contract, a flat-rate contract, and other contracts that are not the one-off contract or the flat-rate contract.

Specifically, according to FIG. 4, an order request is sent in a case where the contract information is "ONE-OFF CONTRACT" and the ink tank information is "SETUP INK TANK" or "ONE-OFF INK TANK". Further, in a case where the contract information is "FLAT-RATE CONTRACT" and the ink tank information is "FLAT-RATE INK TANK", an order request is sent. Furthermore, in a case where the combination of the contract information and the ink tank information is a combination other than the above-described combinations, an order request is not sent.

Therefore, in the determination as to whether or not to send an order request, it is determined that an order request for a setup ink tank is sent, for example, in a case where the contract information is "ONE-OFF CONTRACT" and the ink tank information is "SETUP INK TANK", based on the table of FIG. 4. Further, for example, in a case where the contract information is "FLAT-RATE CONTRACT" and the ink tank information is "ONE-OFF INK TANK", it is determined that an order request is not sent, based on the table of FIG. 4.

As described above, in the present embodiment, in a case where the ink tank of which the ink remaining amount is equal to or less than a predetermined amount corresponds to the contract information stored in the non-volatile memory 222, it is determined that the condition under which an order request can be sent is satisfied, and a process of sending an order request is performed. In other words, in a case where the ink remaining amount of an ink tank that is suitable for contract information is equal to or less than a predetermined amount, it is determined that the condition under which an order request can be sent is satisfied, and the process of sending an order request is performed. Further, in a case where the ink remaining amount of an ink tank that is not suitable for contract information is equal to or less than a predetermined amount, it is determined that the condition under which an order request can be sent is not satisfied, so that an order request is not sent. Accordingly, ordering of an ink tank can be appropriately performed according to contract information.

In S308, in a case where it is determined that an order request will not be sent, this determination process ends. On the other hand, in S308, in a case where it is determined that an order request will be sent, the print controller 202 instructs the main controller 101 for sending an order request (S310), and this determination process ends. That is, in S310, an order request is output from the print controller 202 to the main controller 101 together with the ink tank information of the ink tank 224 of which the ink remaining amount is equal to or less than the predetermined amount. Further, to this order request, additional information that is associated with the ink tank information, which is sent together, is added. Note that, in a case where it is determined in S308 that an order request will be sent for multiple ink tanks 224, an order request for the multiple ink tanks 224 is to be output to the main controller 101 in S310.

Further, without an instruction for sending an order request, the main controller 101 does not send an order request to the ordering server 111. On the other hand, with an instruction for sending an order request, the main controller 101 sends an order request to the ordering server 111 via the server I/F 110 together with the ink tank information and the additional information. Upon receiving this order request, the ordering server 111 determines the detailed order contents and places an order based on the determined order contents. That is, the type of ink tank 224 to be ordered and presence or absence of a cost charge are determined based on the ink tank information and the additional information. Note that the request sent to the ordering server 111 only needs to be a predetermined request including ink tank information and additional information, and it is not necessary that an order is explicitly requested. Furthermore, in a case where the ordering server 111 receives a predetermined request including ink tank information and additional information from the printing apparatus 1, the ordering server 111 may interpret the predetermined request as an order request and perform processing.

FIG. 5 is a table for determining the type of ink tank 224 to be ordered and presence or absence of a cost charge. In the table of FIG. 5, the type of ink tank 224 and presence or absence of a cost charge are associated with each of the combinations of color information of ink, which is additional information, and ink tank information.

Specifically, in FIG. 5, the cost is charged in a case where the ink tank information is "SETUP INK TANK" or "ONE-OFF INK TANK", and the cost is not charged in a case where the ink tank information is "FLAT-RATE INK TANK". Further, based on the color information, determination of an ink tank 224 storing cyan ink, magenta ink, yellow ink, or black ink is made.

Therefore, for example, in a case where the color information, which is additional information, is "CYAN" and the ink tank information is "ONE-OFF INK TANK", the order contents are determined so that a one-off ink tank storing cyan ink is delivered and the cost is charged. Further, in a case where the color information is "BLACK" and the ink tank information is "FLAT-RATE INK TANK", the order contents are determined so that a flat-rate ink tank storing black ink is delivered and the cost is not charged.

Note that, although an ink remaining amount, ink tank information, and additional information are obtained in S302 of the determination process in FIG. 3, the determination process is not limited as such. That is, it is also possible that only an ink remaining amount is obtained in S302, then ink tank information is obtained immediately before the process of S308, and then additional information is obtained immediately before the process of S310.

As explained above, for the printing apparatus 1, the ordering system 500 capable of automatically ordering an ink tank 224 is configured with the contract management server 112 that manages contract information and the ordering server 111 that places an order of an ink tank 224. In a case where the ink remaining amount of an ink tank 224 becomes equal to or less than a predetermined amount, the printing apparatus 1 determines whether or not to send an order request for the ink tank 224 to the ordering server 111. This determination is made based on contract information obtained from the contract management server 112 and ink tank information of the mounted ink tank 224.

Accordingly, even though the ordering system 500 includes the ordering server 111 that cannot obtain contract information, it is possible for the ordering system 500 to order a consumable according to the contract information without incurring a high cost.

The present embodiment is particularly effective in such a form where various types of consumables can be mounted on the printing apparatus 1 in accordance with contract information and the types of consumables mounted on the printing apparatus 1 cannot be immediately specified based on information of the apparatus type of the printing apparatus 1 only.

Second Embodiment

Figure 6:
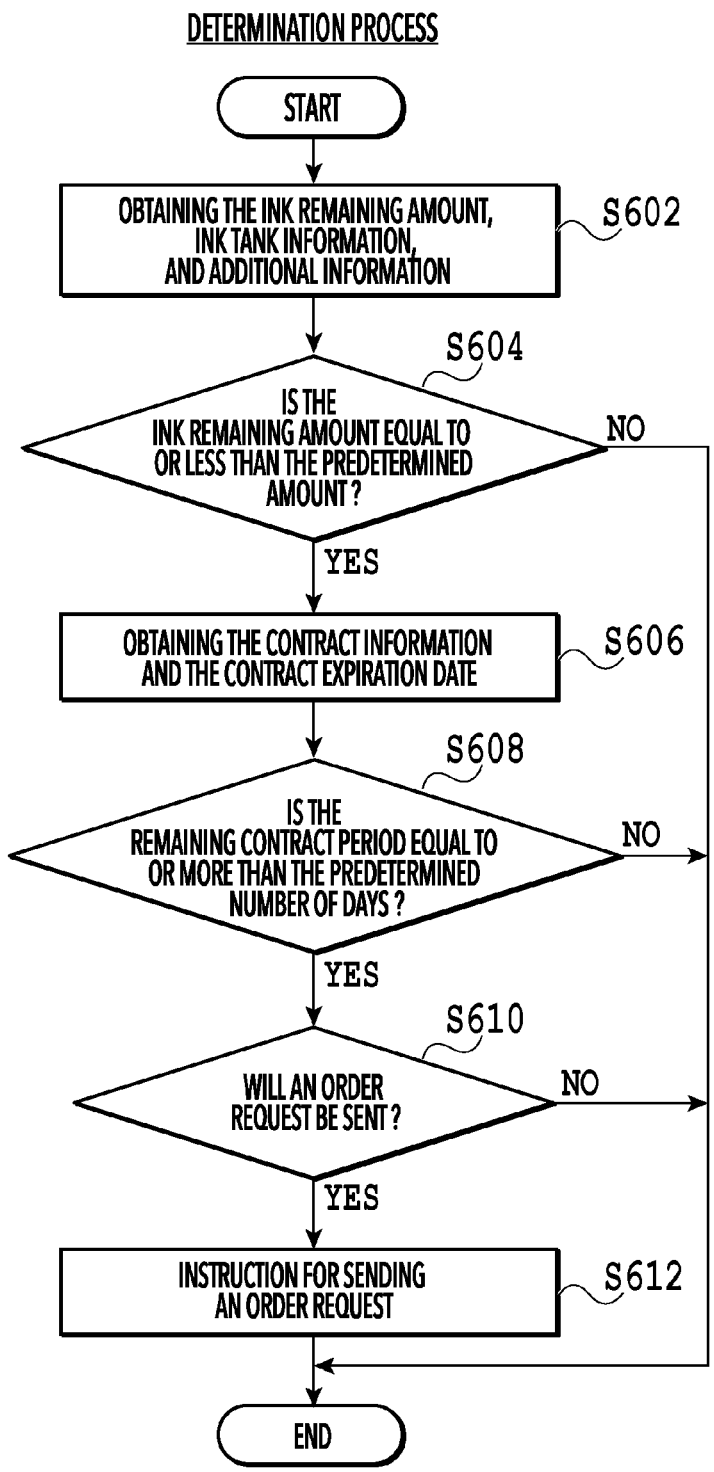
FIG. 6 is a flowchart illustrating details of processing of a determination process performed by the printing apparatus according to the second embodiment.

Next, with reference to FIG. 6, an explanation is given of the printing apparatus according to the second embodiment. Note that, in the following explanation, the same or corresponding configurations as those of the printing apparatus according to the first embodiment described above are assigned with the same signs as those used in the first embodiment, so as to omit detailed explanations thereof.

This second embodiment is different from the printing apparatus according to the first embodiment described above in terms of the determination based on an ink remaining amount as well as a remaining contract period, which is performed before whether or not to send an order request is determined.

Specifically, in the present embodiment, the contract management server 112 manages contract information for the printing apparatus 1 as well as the contract expiration date of the contract information. Further, the main controller 101 periodically obtains contract information for the printing apparatus 1 and the contract expiration date corresponding to the contract information from the contract management server 112 via the server I/F 110 and stores the obtained contract information and contract expiration date in the non-volatile memory 222. Then, in the determination process, the contract expiration date corresponding to the contract information is obtained from the contract management server 112 together with the contract information, and, after determination based on the obtained contract expiration date is performed, determination as to whether or not to send an order request is performed.

FIG. 6 is a flowchart illustrating details of processing of the determination process performed by the printing apparatus according to the second embodiment. The series of processes illustrated in the flowchart of FIG. 6 is performed by the print controller 202 retrieving a program code stored in the ROM 203 into the RAM 204 and executing the program code. Alternatively, a part or all of the functions in the steps of FIG. 6 may be executed by hardware such as an ASIC or an electronic circuit.

This determination process is executed by the print controller 202, based on an instruction from the main controller 101. In the present embodiment, the main controller 101 periodically instructs the print controller 202 to execute the determination process.

In a case where the determination process is started based on the instruction from the main controller 101, the print controller 202 firstly obtains the ink remaining amount, ink tank information, and additional information of each ink tank 224 (S602). Next, the print controller 202 compares the obtained ink remaining amount with the predetermined amount stored in the non-volatile memory 222 and determines whether or not the ink remaining amount is equal to or less than the predetermined amount (S604). Note that, since the specific details of processing of S602 and S604 are the same as those of S302 and S304 described above, respectively, the detailed explanations thereof are omitted. Then, in a case where it is determined in S604 that the ink remaining amount is equal to or less than the predetermined amount, the print controller 202 obtains the contract information for the printing apparatus 1 and the contract expiration date corresponding to the contract information, which are stored in the non-volatile memory 222 (S606).

Thereafter, the print controller 202 determines whether or not the remaining contract period is equal to or more than a predetermined number of days (S608). That is, in S608, the date on which this determination process is performed is obtained, so as to determine whether or not the difference between the date and the contract expiration date obtained in S606 is equal to or more than the predetermined number of days. Note that the printing apparatus 1 is provided with a counter (not illustrated in the drawings) for counting dates, so that the print controller 202 obtains the date counted by this counter as the current date. In addition, the setting of the predetermined number of days can be appropriately changed. For example, the predetermined number of days is set according to the number of days taken for delivering the consumable.

In a case where it is determined in S608 that the remaining contract period is not equal to or more than the predetermined number of days, that is, that the remaining contract period is less than the predetermined number of days, this determination process ends. On the other hand, in a case where it is determined in S608 that the remaining contract period is equal to or more than the predetermined number of days, the print controller 202 determines whether or not to send an order request to the ordering server 111, based on the contract information obtained in S606 and the ink tank information obtained in S602 (S610). In a case where it is determined in S610 that an order request will not be sent, this determination process ends. On the other hand, in a case where it is determined in S610 that an order request will be sent, the print controller 202 instructs the main controller 101 for sending an order request (S612), and this determination process ends. Note that, since the specific details of processing of S610 and S612 are the same as those of S308 and S310 described above, respectively, the detailed explanations thereof are omitted.

As described above, in the present embodiment, it is determined that the condition under which an order request can be sent is satisfied in a case where the ink tank of which the ink remaining amount is equal to or less than a predetermined amount corresponds to the contract information stored in the non-volatile memory 222 and the remaining contract period is equal to or more than a predetermined number of days. Then, the process of sending an order request is performed. Note that, in cases other than the above, it is determined that the condition under which an order request can be sent is not satisfied, so that an order request will not be sent.

Further, without an instruction for sending an order request, the main controller 101 does not send an order request to the ordering server 111. On the other hand, with an instruction for sending an order request, an order request is sent to the ordering server 111 via the server OF 110 together with the ink tank information and the additional information. Upon receiving the order request, the ordering server 111 determines a detailed order request by use of the table of FIG. 5, etc., and places an order based on the determined contents.

As explained above, in the printing apparatus 1 according to the second embodiment, after the determination based on an ink remaining amount, in a case where the remaining contract period is equal to or more than a predetermined number of days, whether or not to send an order request is determined. Accordingly, in the ordering system 500 including the printing apparatus 1, it is possible to appropriately manage the contents of a contract, in addition to the effect of the first embodiment.

Other Embodiments

Note that the above-described embodiments may be modified as shown in the following (1) through (4).

(1) Although the cases in which an ink tank 224 storing ink is ordered as a consumable are explained in the above-described embodiments, the consumable to be ordered in the ordering system 500 is not limited to ink. That is, the consumable to be ordered may be, for example, a conveyance roller 7 having a durable life. In this case, the position information of the conveyance roller 7, etc., are information related to the consumable. Further, in the determination process, the degree of consumption or use of the consumable is detected, and, in a case where it is determined that this degree exceeds a predetermined degree, contract information, etc., are obtained.

Further, the present embodiments are not limited to the ordering system 500 that automatically orders a consumable in the printing apparatus 1. That is, it is also possible to apply the present embodiments as an ordering system for a consumable in various kinds of processing apparatuses that perform predetermined processing with consumption of consumables.

(2) Although the determination process ends in a case where it is determined that the remaining contract period is not equal to or more than the predetermined number of days in the above-described second embodiment, the second embodiment is not limited as such. That is, the contract management server 112 also manages next contract information, which corresponds to the contract after the current contract ends, in addition to the current contract information and the contract expiration date corresponding to the current contract information. Further, the current contract information for the printing apparatus 1, contract expiration date corresponding to the current contract information, and next contract information, which are managed by the contract management server 112, are stored in the non-volatile memory 222 by the main controller 101.

Then, in the determination process, in a case where it is determined in S608 that the remaining contract period is less than the predetermined number of days, whether or not new contract information (next contract information) after the contract expiration date is present is determined, and, in a case where it is determined that new contract information is not present in this determination, the determination process ends. Further, in a case where it is determined that new contract information is present in the above-described determination, whether or not to send an order request is determined based on the new contract information, that is, the next contract information. Here, there may be a case in which the new contract information is different from the current contract information. In this case, the ink tank information, etc., which are the information related to the consumable obtained in S602, do not correspond to the new contract information. Therefore, in a case where it is determined that new contract information is present in the above-described determination, whether or not to send an order request is determined based on the new contract information only.

Accordingly, it is possible for the ordering system 500 to appropriately place an order according to the contract contents for the printing apparatus 1. For example, in a case where the remaining contract period, which is calculated based on the date on which the determination process is performed and the contract expiration date, is shorter than the number of days in which the consumable can be delivered and the current contract information is different from the next contract information, the next contract information is reflected for ordering a consumable for the user.

(3) Although there are two types of contract information, that is, the one-off contract and the flat-rate contract in the above-described embodiments, it is also possible that there are three or more types. Further, although the explanations are given of the cases in which the printing apparatus 1 performs printing by use of four types of ink in the above-described embodiments, the types of ink that can be used may also be one to three types or five or more types. Furthermore, although the printing apparatus 1 includes the ink remaining amount sensor 226 for obtaining the ink remaining amount in the above-described embodiments, the present embodiments are not limited as such. That is, it is also possible that the printing apparatus 1 is configured to detect and obtain the ink remaining amount by use of a sensor that is provided separately from the printing apparatus 1, for example, as long as it is possible to obtain the ink remaining amount. Moreover, although the ink remaining amount is obtained in order to determine the degree of consumption of the consumable in the above-described embodiments, the present embodiments are not limited as such, and any types of information, such as the consumption of ink, can be obtained as long as it is information related to the consumed amount of ink. For example, in a configuration where the consumption of ink is obtained, whether or not the consumption of ink exceeds a predetermined consumption amount is determined in the determination process, and, in a case where it is determined that the consumption of ink exceeds the predetermined consumption amount, the contract information, etc., are obtained.

(4) Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

(5) The above-described embodiments and various forms shown in (1) through (4) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-014808, filed Jan. 31, 2020, which is hereby incorporated by reference herein in its entirety.

What is claimed is:

1. A printing apparatus comprising:
a first obtaining unit configured to obtain a degree of consumption or use of a consumable and information related to a consumable;
a second obtaining unit configured to obtain information related to a current contract and information related to a next contract, and a contract expiration date of the current contract as information related to a contract; and
a sending unit configured to send an order request for requesting an ordering apparatus to order a consumable in a case where a predetermined condition regarding a consumable of which the degree exceeds a predetermined degree is satisfied based on the information related to the contract and the information related to the consumable,
wherein the sending unit sends the order request based on the information related to the current contract and the information related to the consumable in a case where a remaining contract period based on the contract expiration date of the current contract is equal to or more than a predetermined number of days and sends the order request based on the information related to the next contract in a case where the remaining contract period based on the contract expiration date of the current contract is less than the predetermined number of days.

2. The printing apparatus according to claim 1, wherein the sending unit does not send the order request unless the predetermined condition regarding a consumable of which the degree exceeds the predetermined degree is satisfied based on the information related to the contract and the information related to the consumable.

3. The printing apparatus according to claim 1, wherein the information related to the contract includes information related to a one-off contract, in which a cost is incurred at a timing of ordering a consumable, and information related to a flat-rate contract, in which a flat-rate cost is periodically paid so that a cost is not incurred at a timing of ordering a consumable.

4. The printing apparatus according to claim 3,
wherein the information related to the contract is associated with the information related to the consumable, and
wherein the sending unit determines that the predetermined condition is satisfied in a case where the information related to the contract is the information related to the one-off contract and the information related to the consumable is associated with the one-off contract or in a case where the information related to the contract is the information related to the flat-rate contract and the information related to the consumable is associated with the flat-rate contract.

5. The printing apparatus according to claim 1,
wherein a consumable is an ink tank that is detachably installed,
wherein the degree is information related to a consumed amount of ink stored in the ink tank, and
wherein the information related to the consumable is ink tank information that indicates a type of the ink tank corresponding to a contract.

6. The printing apparatus according to claim 5,
wherein the information related to the consumable further is information related to a color of stored ink, and
wherein the sending unit sends the order request to which the ink tank information and the information related to the color are added.

7. An ordering system comprising:
an ordering apparatus that orders a consumable in response to a request,
a printing apparatus that performs printing with consumption of a consumable, and
a management apparatus that manages a current contract for the printing apparatus,
wherein the printing apparatus comprises:
a first obtaining unit configured to obtain a degree of consumption or use of a consumable and information related to a consumable;
a second obtaining unit configured to obtain information related to the current contract managed by the management apparatus, information related to a next contract, and a contract expiration date of the current contract; and
a sending unit configured to send an order request for requesting the ordering apparatus to order a consumable in a case where a predetermined condition regarding a consumable of which the degree exceeds a predetermined degree is satisfied based on the information related to the contract and the information related to the consumable,
wherein the sending unit sends the order request based on the information related to the current contract and the information related to the consumable in a case where a remaining contract period based on the contract expiration date of the current contract is equal to or more than a predetermined number of days and sends the order request based on the information related to the next contract in a case where the remaining contract period based on the contract expiration date of the current contract is less than the predetermined number of days.

8. A control method comprising:
a first obtaining step of obtaining a degree of consumption or use of a consumable and information related to a consumable;
a second obtaining step of obtaining information related to a current contract, information related to a next contract, and a contract expiration date of the current contract; and
a sending step of sending an order request for requesting an ordering apparatus to order a consumable in a case where a predetermined condition regarding a consumable of which the degree exceeds a predetermined degree is satisfied based on the information related to the contract and the information related to the consumable, wherein the sending step comprises sending the order request based on the information related to the current contract and the information related to the consumable in a case where a remaining contract period based on the contract expiration date of the current contract is equal to or more than a predetermined number of days and sending the order request based on the information related to the next contract in a case where the remaining contract period based on the contract expiration date of the current contract is less than the predetermined number of days.

* * * * *